July 29, 1930. D. J. LEVINSON 1,771,542
ANTISKID DEVICE
Filed Oct. 15, 1927
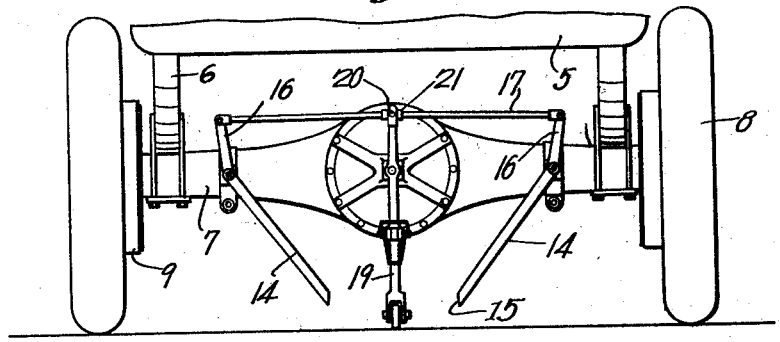
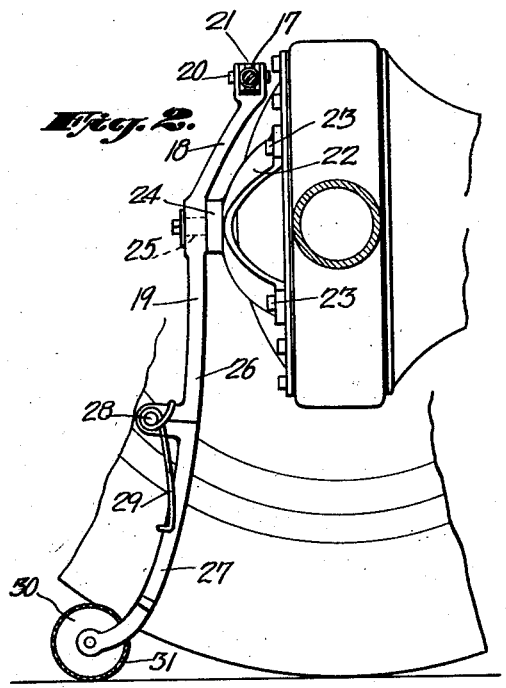
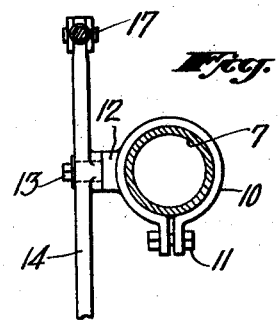
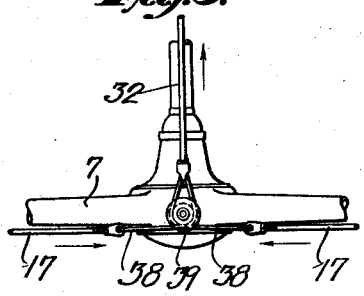
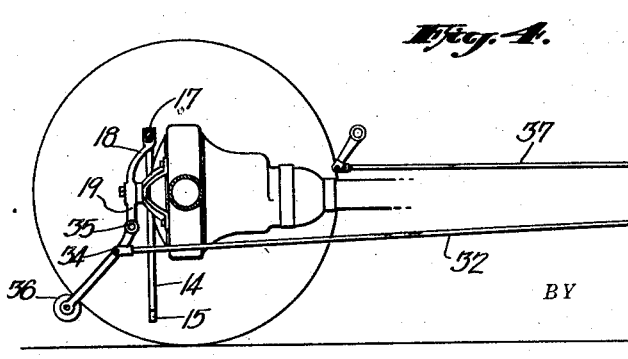
INVENTOR
DAVID J. LEVINSON.
BY Richard ....
ATTORNEY Patented July 29, 1930

1,771,542

UNITED STATES PATENT OFFICE

DAVID J. LEVINSON, OF JAMAICA, LONG ISLAND, NEW YORK

ANTISKID DEVICE

Application filed October 15, 1927. Serial No. 226,415.

This invention relates to anti-skid devices and in particular to a type adapted for use in connection with motor vehicles.

A particular object of the invention is to provide an automatic device which may be attached to motor vehicles at the rear thereof and which depend for their operation upon a skidding movement of the car.

A still further object of the invention is to provide a device which will effectively prevent skidding by throwing against the ground a suitable anti-skid bar which is operated on a drag wheel or lever which partakes of any abnormal sidewise movement of the car to throw the anti-skid levers into position to prevent sidewise skidding movement of the car.

A still further object of my invention is to provide a safety device which, if desired, may be operated from the foot brake lever and which will automatically bring into position a suitable drag which, in turn, will operate the anti-skid levers to prevent skidding of the vehicle.

To enable others skilled in the art to fully comprehend the underlying features of my invention that they may embody the same in the various modifications in structure and relation contemplated, a drawing depicting a preferred form has been annexed as a part of this disclosure and in such drawing, similar reference characters denote corresponding parts throughout all the views, of which, Figure 1 is a fragmentary view in end elevation of a vehicle looking at the rear thereof and showing the connection with the differential and axle housings of my improved anti-skid device.

Figure 2 is an enlarged fragmentary view in side elevation showing how the drag is connected to the differential housing to operate the anti-skid levers upon a sidewise movement of the vehicle.

Figure 3 is a fragmentary view in sectional elevation showing how the anti-skid levers are pivotally connected to the axle housing through the medium of a suitable clamp ring.

Figure 4 is a fragmentary view in side elevation showing how my improved anti-skid device may be operated from the foot brake lever, a drag being connected therewith through the medium of a suitable tie-rod, and Figure 5 is a top plan view showing a method of operating the anti-skid levers from the brake without the use of a drag.

Referring to the drawings in detail, 5 indicates an automobile chassis which is supported through the medium of the usual springs 6 from the rear axle housing 7, the vehicle being provided with the usual wheels 8 and brake drums 9.

It is well known that the sudden application of brakes on a moving vehicle, especially where the friction between the tires and the ground surface is not great enough to prevent sidewise movement of the vehicle, the same skids and in many instances, with detrimental effects.

It is an object of my invention to provide a means whereby the vehicle will be prevented from skidding and, in carrying out my invention, I have fastened to the axle housing adjacent the opposite ends thereof, suitable clamp rings 10 which are secured about the axle housing 7 through the medium of the bolts 11. These clamp rings are provided on their rear surface with an extended boss 12 into which is threaded the journal pin 13 which forms a point of pivotal rotation for the anti-skid levers 14, there being one of each of these type of levers provided at the opposite sides of the vehicle and the levers are so shaped that their lower ends project toward the center of the vehicle and, as indicated by the numeral 15, are sharpened on their lower edges to provide a pick which will dig into the ground to prevent skidding of the vehicle. The upper end of the anti-skid levers 14 are extended as at 16 to receive the ends of the operating bar 17, which connects the extended portions 16 together and is engaged in its mid portion by the upper extended part 18 of the drag arm, or lever 19. The connection of the extension 18 is accomplished by bifurcating the upper end thereof and pivoting the same as at 20 to the collar 21 through which the rod or lever 17 passes. It is quite evident that movement of the pivot pin of the drag arm 19 in sidewise direction will cause one or the other of the anti-skid levers 14 to make contact with the ground thus preventing any great skidding movement.

In order to secure the drag lever 19 to various types of vehicles, I have provided a spider 22 which may be secured to the differential housing through the medium of the bolts 23, the spider being provided at its center with a suitable boss 24 which carries the pivot pin 25, the same passing through the drag arm 19 and forming therefor, a pivotal connection with the spider 22.

While it is quite evident that the drag arm might be made in one piece, yet due to the unevenness of the road and obstructions over which the vehicle passes, I have made the drag arm or lever in two parts, an upper one 26 and a lower one, 27, pivoted together as at 28 and maintained in substantial alignment through the medium of a suitable spring 29, the lower end of the drag carries a roller 30, whose outer surface is corrugated as at 31 so that the maximum resistance to sidewise movement will be offered to the road and consequently a sufficient sidewise movement of the vehicle will, through the medium of the roller 30, cause throw of the operating link 17 in one direction or the other to cause the respective anti-skid lever to dig into the ground to prevent further skidding of the vehicle.

In order to insure that the anti-skid device will operate when the brake lever is applied, I have shown in Figure 4, a tie rod 32 which connects the foot brake lever 33 with the drag arm 19, as at 34, the drag arm 19 being pivoted in its depending portion as at 35 so that the roller 36 carried on the lower end thereof, can be raised off the ground when the foot brake lever is not depressed. It is quite evident that when the foot brake lever 33 is pressed down to draw upon the brake rod 37, the operation of which is well known and need not be described here, that the drag arm 19 will be drawn down until the wheel 36 touches the ground and should the vehicle start to skid, the sidewise movement thereof will cause a drag of the roller 36 on the ground to effectively operate either of the anti-skid levers 14 to prevent further sidewise movement of the vehicle.

If desired, I may dispense with the drag and operate levers 14 by connecting to the rods 17 the cables 38, see Figure 5, the latter being arranged about twin pulleys 39 journalled on the differential housing, the ends of the cables 38 being suitably secured to the tie rod 32.

It is quite evident, therefore, that I have provided a mechanism which will not only effectively prevent the skidding of a vehicle but which may be operated automatically by the skidding motion of the vehicle itself.

It is quite evident, also, that operation of the foot brake lever will cause operation of the anti-skid members to effectively prevent skidding of the vehicle. This is especially true in icy weather when any slight braking movement has a tendency to cause the rear end of the vehicle to swing around.

It is evident, also that I have provided an anti-skid mechanism which may be secured to any car of standard make and which will not interfere with the operation of the vehicle and which will only operate in case of necessity.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention, what I claim as new and desire to secure by United States Letters Patent is:—

1. The combination with a vehicle of an anti-skid device comprising clamp rings arranged about the axle housing of said vehicle, a lever pivotally mounted on each of the said rings and normally out of engagement with the ground, upwardly extending portions on the said levers, means for connecting the said extensions, and a pivotally mounted drag arm in operable engagement at one end thereof with the connecting means and engaging the ground at its opposite end to cause engagement of either of the said levers with the ground upon a skidding movement of the vehicle.

2. The combination with a vehicle of an anti-skid device comprising a pair of spaced apart pivotally mounted levers, a pivoted ground engaging member centrally located between the said levers, and a bar connecting the levers and in operable engagement with the ground engaging member to cause either of the levers to engage the ground upon a skidding movement of the vehicle.

In testimony whereof I affix my signature.

DAVID J. LEVINSON. [L. S.]